United States Patent
Breslow

[11] 3,859,261
[45] Jan. 7, 1975

[54] AZIDES
[75] Inventor: David S. Breslow, Wilmington, Del.
[73] Assignee: Hercules Incorporated, Wilmington, Del.
[22] Filed: Dec. 20, 1972
[21] Appl. No.: 317,014

Related U.S. Application Data
[60] Division of Ser. No. 151,157, June 8, 1971, Pat. No. 3,766,216, which is a continuation-in-part of Ser. No. 761,847, Sept. 23, 1968, abandoned.

[52] U.S. Cl............ 260/79.3 R, 117/128, 117/161, 260/2 EC, 260/2 XA, 260/13, 260/75 NM, 260/78 SC, 260/79 R, 260/827
[51] Int. Cl.... C08f 27/06, C08f 27/08, C08g 23/20
[58] Field of Search......... 260/79.3 R, 349 R, 2 EC, 260/2 XA, 13 R, 75 NM, 78 SC, 79, 827

[56]  References Cited
UNITED STATES PATENTS

| | | | |
|---|---|---|---|
| 3,058,944 | 10/1962 | Breslow | 260/41 |
| 3,284,421 | 11/1966 | Breslow | 260/80.77 |
| 3,583,939 | 6/1971 | Bostick | 260/46.5 |

Primary Examiner—Christopher A. Henderson
Attorney, Agent, or Firm—Marion C. Staves

[57] ABSTRACT

Disclosed are azides of the formula

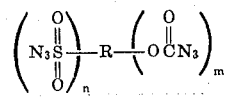

wherein R is a polyvalent organic radical, and $n$ and $m$ are each 1–10. They are useful for bonding receptive polymers to ethylenically unsaturated hydrocarbon silane treated glass and, particularly when $m = 1$, for linking together the polymer chains of receptive polymers. Because in the reaction of these compounds with receptive polymers the azidoformate radicals react substantially faster than the azidosulfonyl radicals, linking of receptive polymers with these compounds can be effected in two steps. (1) After forming a blend of receptive polymer and azide of the formula, establishing and maintaining the blend in a temperature range for a period of time selected to permit at least a substantial portion of the azidoformate radicals to react with the polymer with a minimum of the azidosulfonyl radicals having reacted with the polymer, whereby a substantially nonlinked, but reacted, polymer (ankylomeric polymer) is formed, and (2) establishing and maintaining the ankylomeric polymer in a temperature range for a period of time selected to permit at least a substantial portion of the azidosulfonyl radicals to react with the ankylomeric polymer, whereby linking of the polymer chains takes place.

7 Claims, No Drawings

AZIDES

This application is a division of my copending U.S. application Ser. No. 151,157, filed June 8, 1971, now U.S. Pat. No. 3,766,216, which is in turn a continuation-in-part of application Ser. No. 761,847, filed Sept. 23, 1968, and now abandoned.

This invention comprises a new class of azide compounds and their use in linking polymers. Each member of the class is an organic compound characterized by at least one azidoformate radical and by at least one azidosulfonyl radical. The compounds of this class are represented by the generic formula:

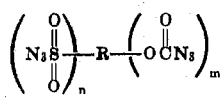

wherein R is a polyvalent organic radical, containing at least one carbon atom per azido group, each azido group being attached to a different carbon atom in said R group, and $n$ and $m$ are integers, generally each being 1–10, and preferably each being 1–2. Generally, R is selected from the group consisting of the saturated and unsaturated, aliphatic, cycloaliphatic and aromatic hydrocarbon, hydrocarbon-oxy-hydrocarbon, and hydrocarbon-sulfonyl-hydrocarbon polyvalent radicals and the corresponding halo-substituted radicals. In preferred embodiments of this invention R is an organic radical selected from the group consisting of radicals derived by the removal of two or more hydrogen atoms from alkanes such as, for example, the straight and branched $C_2$–$C_{100}$, most preferably $C_2$–$C_{20}$, alkanes which include, for instance, ethane, propane, butane, isobutane, pentane and its isomers, hexane and its isomers, octane and its isomers, decane and its isomers, dodecane and its isomers, octadecane and its isomers, and the like; cycloalkanes such as, for example, the $C_3$–$C_{100}$, most preferably $C_3$–$C_{20}$, cycloalkanes which include, for instance, cyclopropane, cyclobutane, cyclopentane, cyclohexane, cyclooctane, and the like; alkyl-cycloalkanes such as, for example, the $C_1$–$C_{20}$ alkyl-($C_3$–$C_{20}$) cycloalkanes which include, for instance, ethylcyclohexane, methylcyclobutane, and the like; arenes such as benzene, naphthalene, diphenyl, and the like; alkyl substituted arenes such as, for example, the $C_1$–$C_{100}$, most preferably $C_1$–$C_{20}$, alkyl substituted arenes whcih include, for instance, toluene, ethylbenzene, o-, m- and p-xylene, o-, m-, and p-diethylbenzene, and the like; alkylene-diarenes such as, for example, the $C_1$–$C_{100}$, most preferably $C_1$–$C_{20}$, alkylene-diarenes which include, for instance, diphenylmethane, 1,2-diphenylethane, 1,1-diphenylpropane, 1,3-diphenylpropane, 2,2-diphenylpropane, and the like; dialkylcycloalkanes such as, for example, the di-($C_1$–$C_{100}$) alkyl-($C_3$–$C_{100}$) cycloalkanes which include, for instance, 1,2-, 1,3-, and 1,4-dimethylcyclohexane, 1,2- and 1,3-dimethylcyclopentane, and the like; and the alkyloxyalkane, aryloxyarene, alkaryloxyarene, alkaryloxyalkarene, aralkyloxyalkane, aralkyloxyaralkane, alkyloxyalkarene, and the like compounds as well as the corresponding sulfonyl compounds specific examples of which include diethyl ether, propyl butyl ether, diphenyl ether, oxy-bis(p-methyl benzene), oxy-bis(phenyl methane), butyl sulfonyl butane, and the like compounds; and the foregoing compounds with fluoro, chloro, bromo and iodo substituents. When an azide of this invention is to be used as a linking agent for polymers, R preferably is substantially inert in the linking reactions.

Exemplary of the new azide compounds of this invention are those compounds having the foregoing generic formula wherein:

1. R is an aliphatic radical:
1-azidosulfonyl ethane-2-azidoformate
1-azidosulfonyl propane-3-azidoformate
1-azidosulfonyl butane-4-azidoformate
1-azidosulfonyl butane-3-azidoformate
2-azidosulfonyl butane-3-azidoformate
1-azidosulfonyl-2,2-dimethyl ethane-2-azidoformate
1-azidosulfonyl-3-methyl propane-3-azidoformate
1-azidosulfonyl-2-methyl propane-3-azidoformate
1-azidosulfonyl pentane-5-azidoformate
1-azidosulfonyl pentane-4-azidoformate
1-azidosulfonyl pentane-3-azidoformate
1-azidosulfonyl pentane-2-azidoformate
4-azidosulfonyl pentane-5-azidoformate
2-azidosulfonyl pentane-5-azidoformate
1-azidosulfonyl-2-methyl butane-2-azidoformate
1-azidosulfonyl-2-methyl butane-3-azidoformate
1-azidosulfonyl-2-methyl butane-4-azidoformate
2-azidosulfonyl-2-methyl butane-3-azidoformate
2-azidosulfonyl-2-methyl butane-4-azidoformate
1-azidosulfonyl-2,2-dimethyl propane-3-azidoformate
1-azidosulfonyl hexane-6-azidoformate
1-azidosulfonyl hexane-5-azidoformate
2-azidosulfonyl hexane-6-azidoformate
2-azidosulfonyl hexane-4-azidoformate
2-azidosulfonyl hexane-5-azidoformate
3-azidosulfonyl hexane-4-azidoformate
1-azidosulfonyl-6-azidoformate hexene-2
1-azidosulfonyl-2-methyl pentane-2-azidoformate
1-azidosulfonyl-2-methyl pentane-3-azidoformate
2-methyl-3-azidosulfonyl pentane-5-azidoformate
2-azidosulfonyl-2-methyl pentane-3-azidoformate
4-azidosulfonyl-4-methyl pentane-5-azidoformate
2-azidosulfonyl-2-methyl pentane-4-azidoformate
1-azidosulfonyl-4-methyl pentane-4-azidoformate
2-azidosulfonyl-3-methyl pentane-4-azidoformate
1-azidosulfonyl-2,2-dimethyl butane-3-azidoformate
1-azidosulfonyl-2,2-dimethyl butane-4-azidoformate
1-azidosulfonyl-3,3-dimethyl butane-4-azidoformate
2,2-dimethyl-3-azidosulfonyl butane-4-azidoformate
1-azidosulfonyl-2,3-dimethyl butane-2-azidoformate
2-azidosulfonyl-2,3-dimethyl butane-3-azidoformate
1-azidosulfonyl heptane-7-azidoformate
2-azidosulfonyl-3-methyl hexane-4-azidoformate
2-azidosulfonyl-2-methyl hexane-6-azidoformate
1-azidosulfonyl-3-methyl hexane-6-azidoformate
2-methyl-4-azidosulfonyl hexane-6-azidoformate
1-azidosulfonyl-4-methyl hexane-2-azidoformate
1-azidosulfonyl-2,2-dimethyl pentane-3-azidoformate
2-azidosulfonyl-4,4-dimethyl pentane-5-azidoformate
1-azidosulfonyl-2,2-dimethyl pentane-5-azidoformate
1-azidosulfonyl-2,4-dimethyl pentane-3-azidoformate
2-azidosulfonyl-2,4-dimethyl pentane-3-azidoformate 2-azidosulfonyl-2,4-dimethyl pentane-4-azidoformate
1-azidosulfonyl octane-8-azidoformate
4-azidosulfonyl octane-5-azidoformate
2-azidosulfonyl-2-methyl heptane-6-azidoformate
2-azidosulfonyl-3-methyl heptane-4-azidoformate
3-azidosulfonyl-4-methyl heptane-4-azidoformate
3-azidosulfonyl-4-methyl heptane-5-azidoformate
1-azidosulfonyl-2,5-dimethyl hexane-2-azidoformate
2-azidosulfonyl-2,5-dimethyl hexane-5-azidoformate
3-azidosulfonyl-3,4-dimethyl hexane-4-azidoformate
1-azidosulfonyl-2,2,4-trimethyl pentane-3-azidoformate
1-azidosulfonyl-2,2,4-trimethyl pentane-4-azidoformate
3-azidosulfonyl-2,2,4-trimethyl pentane-4-azidoformate
1-azidosulfonyl nonane-9-azidoformate
2-azidosulfonyl-2,6-dimethyl heptane-6-azidoformate
1-azidosulfonyl-2,2,5-trimethyl hexane-3-azidoformate
4-azidosulfonyl-2,5,5-trimethyl hexane-6-azidoformate
2-azidosulfonyl-2,3,3,4-tetramethyl pentane-4-azidoformate
1-azidosulfonyl decane-10-azidoformate
1-azidosulfonyl decane-2-azidoformate
1-azidosulfonyl-2-methyl nonane-2-azidoformate
3-azidosulfonyl-2,6-dimethyl octane-8-azidoformate
2-azidosulfonyl-3,7-dimethyl octane-5-azidoformate
4-azidosulfonyl-2,7-dimethyl octane-5-azidoformate
4-azidosulfonyl-4,5-dimethyl octane-5-azidoformate
3-azidosulfonyl-2,2,5,5-tetramethyl hexane-4-azidoformate
3-azidosulfonyl-2,3,4,5-tetramethyl hexane-4-azidoformate
2-azidosulfonyl undecane-3-azidoformate
9-azidosulfonyl undecane-10-azidoformate
1-azidosulfonyl-2-methyl decane-2-azidoformate
2-azidosulfonyl-2,6-dimethyl nonane-8-azidoformate
2-azidosulfonyl-2,6-dimethyl nonane-8-azidoforamte
2-azidosulfonyl-2,8-dimethyl nonane-8-azidoformate
2-azidosulfonyl-3,7-dimethyl nonane-8-azidoformate
3-azidosulfonyl-3-methyl-6-ethyl octane-6-azidoformate
1-azidosulfonyl-2-methyl-5-isobutyl hexane-6-azidoformate
6-azidosulfonyl dodecane-7-azidoformate
1-azidosulfonyl-2-methyl undecane-2-azidoformate
3-azidosulfonyl-3,6-diethyl octane-6-azidoformate
4-azidosulfonyl-4,5-diethyl octane-5-azidoformate
4-azidosulfonyl-2,4,5,7-tetramethyl octane-5-azidoformate
3-azidosulfonyl-2,2,3,4,5,5-hexamethyl hexane-4-azidoformate
1-azidosulfonyl-2-isoamyl-5-methyl hexane-2-azidoformate
1-azidosulfonyl-2-methyl dodecane-2-azidoformate
5-azidosulfonyl-2,5,6,9-tetramethyl decane-6-azidoformate
4-azidosulfonyl-4,5-dipropyl octane-5-azidoformate
1-azidosulfonyl hexadecane-16-azidoformate
1-azidosulfonyl hexadecane-2-azidoformate
1-azidosulfonyl hexadecane-11-azidoformate
6-azidosulfonyl-2,6,7,11-tetramethyl dodecane-7-azidoformate
4-azidosulfonyl-4,9-dipropyl dodecane-9-azidoformate
1-azidosulfonyl octadecane-18-azidoformate
1-azidosulfonyl nonadecane-19-azidoformate
1-azidosulfonyleicosane-20-azidoformate
5-azidosulfonyl-8-isoamyl-2,5,11-trimethyldodecane-8-azidoformate
1-azidosulfonylheneicosane-21-azidoformate
1-azidosulfonyldocosane-22-azidoformate
11-azidosulfonyldocosane-12-azidoformate
10-azidosulfonyl-10,11-dimethyleicosane-11-azidoformate
12-azidosulfonyltetracosane-13-azidoformate
11-azidosulfonyl-11,12,-dimethyldocosane-12-azidoformate
1-azidosulfonyl-4,8,13,17-tetramethyleicosane-20-azidoformate
1-azidosulfonylpentacosane-25-azidoformate
5-azidosulfonyl-5,14-dibutyloctadecane-14-azidoformate
14-azidosulfonyloctacosane-15-azidoformate
1-azidosulfonyldotriacontane-32-azidoformate
1-azidosulfonyltetratriacontane-15-azidoformate
7-azidosulfonyl-7,16-dihexyldocosane-16-azidoformate
18-azidosulfonylhexatriacontane-19-azidoformate
1,2-bis(azidosulfonyl)propane-3-azidoformate
1,3-bis(azidosulfonyl)propane-2-azidoformate
2-azidosulfonylpropane-1,3-bis(azidoformate)
1-azidosulfonylbutane-2,3-bis(azidoformate)
1-azidosulfonylbutane-2,4-bis(azidoformate)
2-azidosulfonylbutane-1,3-bis(azidoformate)
1,2-bis(azidosulfonyl)butane-3-azidoformate
1,2-bis(azidosulfonyl)pentane-3-azidoformate
1,3-bis(azidosulfonyl)pentane-2-azidoformate
1-azidosulfonylpentane-2,3-bis(azidoformate)
1-azidosulfonylpentane-2,4-bis(azidoformate)
1,2-bis(azidosulfonyl)pentane-4-azidoformate
2-azidosulfonylpentane-3,4-bis(azidoformate)
1,2-bis(azidosulfonyl)-2-methylbutane-3-azidoformate
1-azidosulfonylhexane-2,5-bis(azidoformate)
2,3-bis(azidosulfonyl)hexane-4-azidoformate
1,2-bis(azidosulfonyl)-2-methylpentane-3-azidoformate
1,4-bis(azidosulfonyl)heptane-7-azidoformate
1,7-bis(azidosulfonyl)heptane-4-azidoformate
1-azidosulfonylheptane-4,7-bis(azidoformate)
2-methyl-3,5-bis(azidosulfonyl)hexane-6-azidoformate
2-methyl-4-azidosulfonylheptane-6,7-bis(azidoformate)
3,5-bis(azidosulfonyl)-3-ethylhexane-6-azidoformate
3-azidosulfonyl-2,3-dimethylhexane-5,6-bis(azidoformate)
5-azidosulfonyl-5-methyloctane-7,8-bis(azidoformate)
1,2-bis(azidosulfonyl)decane-4-azidoformate
3,6-bis(azidosulfonyl)decane-10-azidoformate
1,2-bis(azidosulfonyl)-4-propylheptane-4-azidoformate
1-azidosulfonyl-4-methyldecane-2,4-bis(azidoformate)
2,3-bis(azidosulfonyl)-2,6-dimethyloctane-8-azidoformate
1-azidosulfonylundecane-5,6-bis(azidoformate)

4,5-bis(azidosulfonyl)-5-ethylnonane-6-azidoformate
1-azidosulfonyloctadecane-9,10-bis(azidoformate)
3-azidosulfonyl-3-ethyltridecane-12,13-bis(azidoformate)
1,2-bis(azidosulfonyl)butane-3,4-bis(azidoformate)
1,2,3-tris(azidosulfonyl)bentane-4-azidoformate
1,2-bis(azidosulfonyl)pentane-3,5-bis(azidoformate)
1,2-bis(azidosulfonyl)hexane-5,6-bis(azidoformate)
1-azidosulfonylhexane-3,4,5-tris(azidoformate)
1,3,5-tris(azidosulfonyl)octane-7-azidoformate
1,7,8-tris(azidosulfonyl)hexadecane-16-azidoformate
9,10-bis(azidosulfonyl)tetratriacontane-25,26-bis(azidoformate)
1,2,3-tris(azidosulfonyl)octane-6,7-bis(azidoformate)
2,3,4,5,6-pentakis(azidosulfonyl)dodecane-8,9-bis(azidoformate)
1,2,3,4,5,8-hexakis(azidosulfonyl)-2-methylhexadecane-10-azidoformate
1,2,3,4,5,6,7,8-octakis(azidosulfonyl)-2,4-dimethylhexadecane-11,12-bis(azidoformate)
2. R is a cycloaliphatic radical
1-azidosulfonylcyclopropane-2-azidoformate
1-azidosulfonyl-2-methylcyclopropane-3-azidoformate
1-azidosulfonylcyclobutane-3-azidoformate
1-azidosulfonylcyclobutylene-3-azidoformate
1-azidosulfonylcyclopentane-2-azidoformate
1-azidosulfonylcyclohexane-3-azidoformate
1-azidosulfonylcyclohexane-4-azidoformate
1-azidosulfonyl-2-methylcyclohexane-4-azidoformate
1-azidosulfonylcyclooctane-4-azidoformate
1-azidosulfonyl-5,5-dimethylcyclohexane-2-azidoformate
2-azidosulfonyl-para-menthane-5-azidoformate
1-azidosulfonylfenchane-4-azidoformate
1-azidosulfonylspiropentane-4-azidoformate
5-azidosulfonylcamphane-6-azidoformate
5-azidosulfonylcamphenilane-6-azidoformate
2-azidosulfonyl-1,2,3,4-tetramethylcycloheptane-3-azidoformate
2-azidosulfonylbicyclopentane-2'-azidoformate
5-azidosulfonyl-1,3-dimethylbicyclo[1,3,3]nonane-7-azidoformate
1-azidosulfonyl-3,3'-dimethylbicyclohexane-1'-azidoformate
3-azidosulfonyl-5,5'-diethylbicyclohexane-3'-azidoformate
1-(3-azidosulfonylcyclohexyl)-2-(3-azidocarbonyloxycyclohexyl)ethane having the formula

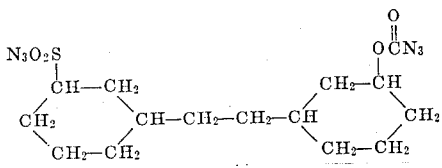

1-(3-azidosulfonyl-5-azidocarbonyloxycyclohexyl)-2-(phenyl)ethane
1-azidosulfonylcyclopentane-4,5-bis(azidoformate)
1,2-bis(azidosulfonyl)-4-methylcyclohexane-6-azidoformate
2,3-bis(azidosulfonyl)-para-menthane-5,6-bis(azidoformate)
bis(4-azidosulfonylcyclohexyl)(4-azidocarbonyloxycyclohexyl)methane
1,2,3-tris azidosulfonylcyclohexane-5-azidoformate
2,3,4,5-tetrakis azidosulfonylcyclononane-7,8,bis azidoformate
1-(3-azidosulfonyl propyl) cyclohexyl-3-azidoformate
3. R is an aromatic radical:
o-azidosulfonylphenyl azidoformate
m-azidosulfonylphenyl azidoformate
p-azidosulfonylphenyl azidoformate
1-azidosulfonyl-4-methylphenyl-2-azidoformate
1-azidosulfonyl-2-methylphenyl-3-azidoformate
1-azidosulfonyl-5-methylphenyl-3-azidoformate
1-azidosulfonyl-4-ethylphenyl-2-azidoformate
1-azidosulfonyl-3,4-dimethylphenyl-2-azidoformate
1-azidosulfonyl-2,3-dimethylphenyl-4-azidoformate
1-azidosulfonyl-2,6-dimethylphenyl-4-azidoformate
1-azidosulfonyl-2,4,5-trimethylphenyl-3-azidoformate
1-azidosulfonyl-2,3,5-trimethylphenyl-4-azidoformate
1-azidosulfonyl-2-isopropylphenyl-4-azidoformate
p-(β-azidosulfonylethyl)phenyl azidoformate
1-azidosulfonyl-2,3,5,6-tetramethylphenyl-4-azidoformate
1-azidosulfonylnaphthylene-2-azidoformate
1-azidosulfonylnaphthylene-6-azidoformate
1-azidosulfonylnaphthylene-4-azidoformate
1-azidosulfonylnaphthylene-7-azidoformate
2-azidosulfonylnaphthylene-6-azidoformate
2-azidosulfonyl-1-methylnaphthylene-3-azidoformate
1-azidosulfonyl-2,3-dimethylnaphthylene-4-azidoformate
1-azidosulfonyl-2,3-dihydroindene-6-azidoformate
2-azidosulfonylbiphenyl-5-azidoformate
2-azidosulfonylbiphenyl-2'-azidoformate
4-azidosulfonylbiphenyl-4'-azidoformate
4-azidosulfonyl-2,2'-dimethylbiphenyl-4'-azidoformate
4-azidosulfonyl-3,3'-dimethyldiphenyl-4'-azidoformate
4-azidosulfonylacenaphthylene-7-azidoformate
3-azidosulfonylacenaphthylene-8-azidoformate
2-azidosulfonylfluoren-3-azidoformate
1-azidosulfonylanthracene-2-azidoformate
1-azidosulfonylanthracene-4-azidoformate
1-azidosulfonylanthracene-5-azidoformate
1-azidosulfonylanthracene-8-azidoformate
2-azidosulfonylanthracene-3-azidoformate
2-azidosulfonylphenanthrene-3-azidoformate
3-azidosulfonylphenanthrene-4-azidoformate
4-azidosulfonylphenanthrene-3-azidoformate
9-azidosulfonylphenanthrene-10-azidoformate
4-azidosulfonyl-2-phenylnaphthalene-8-azidoformate
4-azidosulfonyl-1,3-diphenylphenyl-5-azidoformate
2-azidosulfonyl-1,4-diphenylphenyl-5-azidoformate
(2-azidosulfonyl-5-azidocarbonyloxyphenyl)bis(phenyl)methane
(4-azidosulfonylphenyl) (4-azidocarbonyloxyphenyl)(phenyl)methane 2-azidosulfonyl-1,1'-dinaphthyl-2'-azidoformate
1-azidosulfonylchrysen-2-azidoformate
1-azidosulfonylnaphthacen-2-azidoformate
1-azidosulfonylnaphthacen-4-azidoformate
1-azidosulfonylpyren-2-azidoformate
1,3-bis(azidosulfonyl)phenyl-4-azidoformate
1,2-bis(azidosulfonyl)phenyl-4-azidoformate
1,4-bis(azidosulfonyl)phenyl-2-azidoformate
1-azidosulfonylphenyl-3,5-bis(azidoformate)
1-azidosulfonylphenyl-3,4-bis(azidoformate)
2-azidosulfonylphenyl-3,5-bis(azidoformate)
1-azidosulfonyl-2-methylphenyl-3,5-bis(azidoformate)
3-azidosulfonyl-1-butylphenyl-4,5-bis(azidoformate)
1-azidosulfonyl-2,4,6-trimethylphenyl-3,5-bis(azidoformate)
1,3-bis(azidosulfonyl)-2,4,6-trimethylphenyl-5-azidoformate
1,2-bis(azidosulfonyl)naphthylene-6-azidoformate
1,4-bis(azidosulfonyl)naphthylene-6-azidoformate
1-azidosulfonylnaphthylene-3,8-bis(azidoformate)
2-azidosulfonyl-1-methylnaphthylene-5,6-bis(azidoformate)
2,4-bis(azidosulfonyl)biphenyl-4'-azidoformate
2-azidosulfonylbiphenyl-3',5'-bis(azidoformate)
1-azidosulfonylanthracene-34,-bis(azidoformate)
2,3-bis(azidosulfonyl)phenanthrene-9-azidoformate
bis(4-azidosulfonylphanyl) (4-azidocarbonyloxyphenyl)methane
2,4-bis(azidosulfonyl)-6-azidocarbonyloxyphenyl-bis(phenyl)methane
1,2-bis(azidosulfonyl)phenyl-4,5-bis(azidoformate)
1-azidosulfonylphenyl-2,4,6-tris(azidoformate)
1,3,5-tris(azidosulfonyl)phenyl-4-azidoformate
2,4,6-tris(azidosulfonyl)-1-methylphenyl-5-azidoformate
1,2-bis(azidosulfonyl)naphthylene-5,6-bis(azidoformate)
2,2'-bis(azidosulfonyl)biphenyl-4,4'-bis(azidoformate)
3,3'-bis(azidosulfonyl)-4,4'-dimethylbiphenyl-5,5'-bis(azidoformate)
2,6-bis(azidosulfonyl)biphenyl-4,4'-bis(azidoformate)
2,4',6-tris(azidosulfonyl)biphenyl-4-azidoformate
bis(2-azidosulfonyl-4-azidocarbonyloxyphenyl) (cyclohexyl)methane
1,3,5-tris(azidosulfonyl)phenyl-2,4-bis(azidoformate)
1,2,3,4-tetrakis(azidosulfonyl)naphthylene-7-azidoformate
1,3,5-tris(azidosulfonyl)phenyl-2,4,6-tris(azidoformate)
1-azidosulfonyl-3-(β-azidosulfonylethyl)phenyl-5-azidoformate
1,2,5-tris(azidosulfonyl)phenyl-3,4,6-tris(azidoformate)
1,2,4,5-tetrakis(azidosulfonyl)phenyl-3,6-bis(azidoformate)
1,2,3-tris(azidosulfonyl)naphthyl-5,6,7-tris(azidoformate)
2,2',6,6'-tetrakis(azidosulfonyl)biphenyl-4,4'-bis(azidoformate)
tris(2,6-bis(azidosulfonyl)-4-azidocarbonyloxyphenyl)methane
tris(2,6-bis(azidosulfonyl)-3,4-bis(azidocarbonyloxy)phenylene)methane m-azidosulfonylbenzyl azidoformate
p-azidosulfonylphenethyl azidoformate
p-(p'-azidosulfonylbenzyl)phenyl azidoformate
p-(p'-azidosulfonylphenethyl)phenyl azidoformate 4. R is hydrocarbon-oxy-hydrocarbon
2-azidosulfonyloxydiethyl-2'-azidoformate
2-azidosulfonyloxydipropyl-2'-azidoformate
3-azidosulfonyloxydipropyl-3'-azidoformate
3-azidosulfonyloxydibutyl-3'-azidoformate
4-azidosulfonyloxydibutyl-4'-azidoformate
1-(3-azidosulfonylpropoxy)-butyl-4-azidoformate
3,4-bis(azidosulfonyl)oxydibutyl-3',4'-bis(azidoformate)
3-azidosulfonyloxydicyclopentane-3'-azidoformate
4-azidosulfonyloxydicyclohexane-4'-azidoformate
1-(2-azidosulfonylethoxy)cyclohexane-4-azidoformate
1-(4-azidosulfonylcyclohexoxy)ethane-2-azidoformate
4-azidosulfonyl-2,2'-dimethyloxydichlorohexane-4'-azidoformate
3,4-bis(azidosulfonyl)oxydicyclohexane-3',4'-bis(azidoformate)
4-azidosulfonyloxydiphenyl-4'-azidoformate
3-azidosulfonyloxydiphenyl-3'-azidoformate
2-azidosulfonyloxydiphenyl-2'-azidoformate
3,4-bis(azidosulfonyl)oxydiphenyl-3',4'-bis(azidoformate)
4,4'-bis(azidosulfonyl)oxydiphenyl-3,3'-bis(azidoformate)
1-(2-azidosulfonylethoxy)phenyl-3-azidoformate
2,6-bis(2-azidosulfonylethoxy)phenyl-4-azidoformate
4-azidosulfonyloxydibenzyl-4'-azidoformate 5. R is hydrocarbon-sulfonyl-hydrocarbon
1-(2-azidosulfonylethylsulfonyl)ethane-2-azidoformate
1-(4'-azidosulfonylbutylsulfonyl)butane-4-azidoformate
1-(4'-azidosulfonylcyclohexylsulfonyl)cyclohexane-4-azidoformate
1-(2-azidosulfonylethylsulfonyl)cyclohexane-4-azidoformate
1-(2',4'-bis(azidosulfonyl)cyclohexylsulfonyl)cyclohexane-2,4-bis(azidoformate)
1-(4'-azidosulfonylphenylsulfonyl)phenyl-4-azidoformate
1-(2-azidosulfonylethylsulfonyl)phenyl-4-azidoformate
1-(2',4'-bis(azidosulfonyl)phenylsulfonyl)phenyl-2,4-bis(azidoformate)
1-(2'-azidosulfonyl-4'-azidoformatephenylsulfonyl)phenyl-2-azidosulfonyl-4-azidoformate 6. R is a corresponding halo-substituted radical
1-azidosulfonyl-2-chloropropane-3-azidoformate
1-azidosulfonyl-2-fluoropropane-3-azidoformate
1-azidosulfonyl-2-iodopropane-3-azidoformate
1-azidosulfonyl-2-bromopropane-3-azidoformate
1-azidosulfonyl-3-chloropropane-2-azidoformate
1-azidosulfonyl-3-bromopropane-2-azidoformate
1-azidosulfonyl-2,2-dichloropropane-3-azidoformate
1-azidosulfonyl-2,2-difluoropropane-3-azidoformate
1-azidosulfonyl-2,2-diiodopropane-3-azidoformate
1-azidosulfonyl-2,2-dibromopropane-3-azidoformate
1-azidosulfonyl-2-chlorobutane-4-azidoformate 1-azidosulfonyl-2,2-dichlorobutane-4-azidoformate
1-azidosulfonyl-2,3-dichlorobutane-4-azidoformate
1-azidosulfonyl-2,2,3-trichlorobutane-4-azidoformate
1-azidosulfonyl-2,3,3-trichlorobutane-4-azidoformate
1-azidosulfonyl-2,2,3,3-tetrachlorobutane-4-azidoformate
1-azidosulfonyl-4,4,4-trichorobutane-3-azidoformate
1-azidosulfonyl-3,4-difluorobutane-2-azidoformate
1-azidosulfonyl-2,3-dibromobutane-4-azidoformate
1-azidosulfonyl-2-chloromethylpropane-3-azidoformate
1-azidosulfonyl-2,3,4-trichloropentane-5-azidoformate
1-azidosulfonyl-2,3,4-tribromopentane-5-azidoformate
1-azidosulfonyl-2,2,3,3,4,4-hexachloropentane-5-azidoformate
1-azidosulfonyl-3,4,5,6-tetraiodohexane-2-azidoformate
2-azidosulfonyl-4,5-difluorohexane-6-azidoformate
2-azidosulfonyl-1,3-dibromo-4-bromomethylpentane-5-azidoformate
1-azidosulfonyl-2-chlorohexane-6-azidoformate
1-azidosulfonyl-3-chlorohexane-6-azidoformate
1-azidosulfonyl-4-chlorohexane-6-azidoformate
1-azidosulfonyl-5-chlorohexane-6-azidoformate
1-azidosulfonyl-2,3-dichlorohexane-6-azidoformate
1-azidosulfonyl-2,4-dichlorohexane-6-azidoformate
1-azidosulfonyl-2,5-dichlorohexane-6-azidoformate
1-azidosulfonyl-3,4-dichlorohexane-6-azidoformate
1-azidosulfonyl-3,5-dichlorohexane-6-azidoformate
1-azidosulfonyl-4,5-dichlorohexane-6-azidoformate
1-azidosulfonyl-2,3,4-trichlorohexane-6-azidoformate
1-azidosulfonyl-2,3,5-trichlorohexane-6-azidoformate
1-azidosulfonyl-2,4,5-trichlorohexane-6-azidoformate
1-azidosulfonyl-3,4,5-trichlorohexane-6-azidoformate
1-azidosulfonyl-2,3,4,5-tetrachlorohexane-6-azidoformate
1-azidosulfonyl-2,2,3,4,5-pentachlorohexane-6-azidoformate
1-azidosulfonyl-2,3,3,4,5-pentachlorohexane-6-azidoformate
1-azidosulfonyl-2,3,4,4,5-pentachlorohexane-6-azidoformate
1-azidosulfonyl-2,3,4,5,5-pentachlorohexane-6-azidoformate
1-azidosulfonyl-2,2,3,3,4,5-hexachlorohexane-6-azidoformate
1-azidosulfonyl-2,2,3,4,4,5-hexachlorohexane-6-azidoformate
1-azidosulfonyl-2,3,3,4,5,5-hexachlorohexane-6-azidoformate
1-azidosulfonyl-2,2,3,3,4,4-hexachlorohexane-6-azidoformate
1-azidosulfonyl-2,2,3,3,4,4,5,5-octachlorohexane-6-azidoformate
1-azidosulfonyl-3-chloroheptane-7-azidoformate
1-azidosulfonyl-3,4,5-triiodoheptane-7-azidoformate
1-azidosulfonyl-2,3,4,5,6-pentafluoroheptane-7-azidoformate
3-azidosulfonyl-1,1,2,4,5,6-hexabromoheptane-7-azidoformate
1-azidosulfonyl-3,3-dichloromethylpentane-5-azidoformate
1-azidosulfonyl-3,5-dichlorooctane-8-azidoformate
1-azidosulfonyl-2,3,4,5,6,7-hexachlorooctane-8-azidoformate
1-azidosulfonyl-2,3,4,5,6,7,8-heptachlorononane-9-azidoformate
1-azidosulfonyl-5-bromodecane-10-azidoformate
1-azidosulfonyl-4-(1,2-dichloroethyl)decane-10-azidoformate
1-azidosulfonyl-3,6,7,8,10-pentachlorohexadecane-16-azidoformate
1-azidosulfonyl-2,5,8,10,11,13,14,17-octachloroeicosane-20-azidoformate
1-azidosulfonyl-2-chlorobutane-3,4-bis(azidoformate)
1-azidosulfonyl-2,2-dichlorobutane-3,4-bis(azidoformate)
1-azidosulfonyl-2-fluorobutane-3,4-bis(azidoformate)
1-azidosulfonyl-2-bromobutane-3,4-bis(azidoformate)
1-azidosulfonyl-2-iodobutane-3,4-bis(azidoformate)
1,2-bis(azidosulfonyl)-3-chloropentane-5-azidoformate
1-azidosulfonyl-3,4-difluorohexane-5,6-bis(azidoformate)
1-azidosulfonyl-3,4,5,6-tetrachlorodecane-9,10-bis(azidoformate)
1,2,3-tris (azidosulfonyl)-4-chloropentane-5-azidoformate
1,2,3-tris (azidosulfonyl)-5-bromooctane-7,8-bis(azidoformate)
1,3,5-tris (azidosulfonyl)-15-chlorooctadecane-18-azidoformate
1-azidosulfonyl-2-chlorocyclobutane-3-azidoformate
1-azidosulfonyl-2-fluorocyclobutane-3-azidoformate
1-azidosulfonyl-2-bromocyclobutane-3-azidoformate
1-azidosulfonyl-2-iodocyclobutane-3-azidoformate
1-azidosulfonyl-2,4-dichlorocyclobutane-3-azidoformate
1-azidosulfonyl-2,3,4-trichlorocyclopentane-5-azidoformate
1-azidosulfonyl-2-chlorocyclohexane-4-azidoformate
1-azidosulfonyl-2,5-dichlorocyclohexane-4-azidoformate
1-azidosulfonyl-2,3,5-trichlorocyclohexane-4-azidoformate
1-azidosulfonyl-2,3,5,6-tetrachorocyclohexane-4-azidoformate
1-azidosulfonyl-2,2,3,3,5,5,6,6-octachlorocyclohexane-4-azidoformate
1-azidosulfonyl-2,3,5,6-tetrafluorocyclohexane-4-azidoformate
1-azidosulfonyl-2,3,5,6-tetrabromocyclohexane-4-azidoformate
1-azidosulfonyl-2,5-diiodocyclohexane-4-azidoformate
1-azidosulfonyl-3-chlorocycloheptane-5-azidoformate
1,2-bis(azidosulfonyl)-5-chlorocyclohexane-4-azidoformate
2,3-bis(azidosulfonyl)-4-chlorocyclohexane-5,6-bis(azidoformate)

1-azidosulfonyl-2-chlorophenyl-4-azidoformate
1-azidosulfonyl-2-fluorophenyl-4-azidoformate
1-azidosulfonyl-2-bromophenyl-4-azidoformate
1-azidosulfonyl-2-iodophenyl-4-azidoformate
1-azidosulfonyl-3-chlorophenyl-4-azidoformate
1-azidosulfonyl-2-chlorophenyl-3-azidoformate
1-azidosulfonyl-4-chlorophenyl-3-azidoformate
1-azidosulfonyl-5-chlorophenyl-5-azidoformate
1-azidosulfonyl-3-chlorophenyl-2-azidoformate
1-azidosulfonyl-4-chlorophenyl-2-azidoformate
1-azidosulfonyl-2,5-dichlorophenyl-4-azidoformate
1-azidosulfonyl-3,5-dichlorophenyl-4-azidoformate
1-azidosulfonyl-3,5-dibromophenyl-4-azidoformate
1-azidosulfonyl-3,5-diiodophenyl-4-azidoformate
1-azidosulfonyl-3,5-difluorophenyl-4-azidoformate
1-azidosulfonyl-2,3,5-trichlorophenyl-4-azidoformate
1-azidosulfonyl-2,4,5-trichlorophenyl-3-azidoformate
1-azidosulfonyl-3,4,5-trichlorophenyl-2-azidoformate
1-azidosulfonyl-2,3,5,6-tetrachlorophenyl-4-azidoformate
1,3-bis(azidosulfonyl)-2,4,6-trichlorophenyl-5-azidoformate
1,2-bis(azidosulfonyl)-3-chlorophenyl-4,5-bis(azidoformate)
1-azidosulfonyl-4-chloronaphthalene-2-azidoformate
1-azidosulfonyl-4-bromonaphthalene-2-azidoformate
1,2-bis(azidosulfonyl)-6-chloronaphthalene-3-azidoformate
1,2-bis(azidosulfonyl)-6-chloronaphthalene-3,4-bis(azidoformate)
4-azidosulfonyl-2,2'-dichlorodiphenyl-4'-azidoformate
4-azidosulfonyl-2,2',5,5',6,6'-hexachlorodiphenyl-4'-azidoformate
3-azidosulfonyl-2,2'-dichlorooxydipropyl-3'-azidoformate
4-azidosulfonyl-2,2'-dibromooxydibutyl-4'-azidoformate
4-azidosulfonyl-2,2',5,5'-tetrachlorooxydicyclohexane-4'-azidoformate
4-azidosulfonyl-2,2'-dichlorooxydiphenyl-4'-azidoformate
4-azidosulfonyl-2,2'-dibromooxydiphenyl-4'-azidoformate
3-azidosulfonyl-5,5'-dichlorooxydiphenyl-3'-azidoformate
3,3'-bis (azidosulfonyl)-5,5'-dichlorooxydiphenyl-4,4'-bis(azidoformate
1-(4'-azidosulfonyl-2'-chlorobutylsulfonyl)-2-chlorobutane-4-azidoformate
1-(4'-azidosulfonyl-3'-chlorocyclohexylsulfonyl)-3-chlorocyclohexane-4-azidoformate
1-(4'-azidosulfonyl-3',5'-dichlorophenylsulfonyl)-3,5-dichlorophenyl-4-azidoformate The azides of this invention in general range from normally liquid to solid at 20°–25°C. and at atmospheric pressure. They have characteristic infrared spectra, each containing the strong azide band at 2100–2200 cm.$^{-1}$, a strong carbonyl band at about 1740 cm.$^{-1}$ and sulfonyl bands at about 1370 cm.$^{-1}$ and 1170 cm.$^{-1}$. When heat is applied to the compounds of this invention, they decompose, giving off nitrogen. As the temperature increases, the overall decomposition rate increases. At any given temperature the azidoformate radicals of these compounds decompose at a faster rate than the azidosulfonyl radicals. In general, the decomposition rate of the azidoformate portion of each compound of this invention is about the same at about 130°C. as the decomposition rate of the azidosulfonyl portion at about 170°C. The azidoformate and azidosulfonyl radicals of the compounds of this invention are very reactive. They readily combine with ethylenically unsaturated hydrocarbon groups in a variety of compounds, including unsaturated hydrocarbon containing silanes. They react with receptive polymers and combine therewith. In so doing, however, the azidoformate portion of the compound in each case has a faster reaction rate than the azidosulfonyl portion at the same temperature. Indeed, in reacting with receptive polymers and the like, the azidoformate portion of the compound in each case has about the same reaction rate at about 130°C. as the azidosulfonyl portion of the compound at about 170°C.

Each of the azide compounds of this invention is made by reacting the corresponding halosulfonylchloroformate compound with alkali metal azide. This is done by admixing the halosulfonylchloroformate compound with one or more alkali metal azides, preferably in a normally liquid medium, in a temperature range of 0°–100°C. and at ambient atmospheric pressure. Examples of alkali metal azides include sodium azide, lithium azide, potassium azide, and the like. Examples of a normally liquid medium include acetone, acetone-water, ethanol, ethanol-water, chlorinated hydrocarbon (for instance, methylene chloride, chloroform, 1,1,2-trichloroethane, and the like, including mixtures of specific chlorinated hydrocarbons)-water, hydrocarbon (for instance, benzene, toluene, xylene and the like, including mixtures of specific hydrocarbons)-water, and the like.

The corresponding halosulfonyl-haloformate compound is made in a number of ways.

One way is by the halosulfonation of the corresponding haloformate. When the corresponding haloformate is an alkyl or cycloalkyl haloformate, the halosulfonation is performed by admixing the haloformate with either sulfuryl halide or a mixture of halogen and sulfur dioxide gases and a peroxide as catalyst. In lieu of a catalyst or in addition to a catalyst, the mixture of reactants can be exposed to ultraviolet light to effect reaction. Preferably the reaction is carried out in a halogenated solvent such as, for example, methylene chloride, ethylene dichloride, chloroform, and the like, and the temperature range is generally from about 0° to about 80°C. When the corresponding haloformate is an aryl haloformate or arylalkyl haloformate the halosulfonation is preferably carried out by admixing the haloformate with halosulfonic acid in a temperature range from about 0 to about 75°C. and preferably in a halogenated solvent like methylene chloride, chloroform, or the like.

The halosulfonation reaction of aliphatic and aromatic chloroformates to give corresponding halosulfonyl-haloformate compounds is an excellent way for introducing one or more halosulfonyl radicals into these chloroformate compounds. However, the reaction product usually comprises a random mixture of isomers. Moreover, in the halosulfonation reaction of aliphatic chloroformates, when the reaction of an aliphatic haloformate with sulfur dioxide and halogen occurs, some of the halogen is also introduced into the compound. This is just a normal halogenation of the alkyl chain. The extent of halogenation of the alkyl chain can be varied, higher temperatures and only small excesses of sulfur dioxide favoring higher halogen contents, but usually halogenation of the alkyl chain cannot be completely eliminated. Halogenation of the alkyl chain is an advantage when it is desired to have a minimum number of sulfonyl azide radicals in the compound, because halo groups and sulfonyl halide groups deactivate adjacent carbon atoms to further substitution. In general, halo radicals in the aliphatic azides of this invention are substantially inert in polymer linking reactions.

Another way of making halosulfonyl-haloformate compounds is by effecting with a catalyst such as dimethylformamide or the like, reaction of the alkali metal salt of the corresponding hydroxy organosulfonic acid with phosgene at about a 2:1 mole ratio at 0°–60°C. or with phosgene at about a 1:1 mole ratio at 0°–60°C. followed by thionyl chloride at about a 1:1 mole ratio at 0°–100°C. Generally this is done by admixing the reactants and the catalyst in a halogenated solvent like methylene chloride, chloroform or the like, or a hydrocarbon like benzene, toluene and the like.

Another process for making compounds of this invention is by reacting (1) an organo compound containing one or more isocyanate radicals and either one or more azidosulfonyl radicals, or one or more azidoformate radicals, with (2) an active hydrogen compound containing either one or more azidoformate radicals or one or more azidosulfonyl radicals. An active hydrogen compound, well defined in the polyurethane art, has at least one radical capable of combination reaction with the isocyanate group. Examples of such a radical include the carboxylic acid radical, the amino radical, the hydroxy radical, and the like.

The azide compounds of this invention are useful for bonding receptive polymers to ethylenically unsaturated hydrocarbon silane treated glass, and they can be used to like, that is, chain extend, bridge, and cross-link, receptive polymers. In linking receptive polymers, compounds of this invention having more than one azidoformate radical per molecule can be used. However, when the linking is performed sequentially (more fully described hereinafter), the compounds having only one azidoformate radical per molecule (in formula $m = 1$) are preferred because there is less chance for premature chain linking to occur. In this specification, receptive polymer means a polymer having, in each polymer chain, at least one and generally more than one monomer unit (referred to as an azidoformate radical reactive monomer unit) capable of combination reaction with an azidoformate radical of a compound of this invention, whereby the residue of the compound is chemically bonded to the polymer, or at least one and generally more than one monomer unit (referred to as an azidosulfonyl reactive monomer unit) capable of combination reaction with an azidosulfonyl radical of any compound of this invention, whereby the residue of the compound is chemically bonded to the polymer. Usually a monomer unit that is capable of combination reaction with the azidoformate radical is capable of combination reaction with the azidosulfonyl radical, and vice versa. Nearly all polymers are receptive polymers. Preferred examples of a receptive polymer include all types of hydrocarbon polymers including saturated and unsaturated, linear and non-linear crystalline and amorphous homopolymers, copolymers, terpolymers, and the like, for example, polyethylene, polypropylene, polystyrene, styrene-butadiene rubber, butyl rubber, natural rubber, polybutadiene, polyisobutylene, ethylene-propylene copolymer, cis-1,4-polyisoprene, ethylene-propylene-dicyclopentadiene terpolymer, and the like, and blends of these polymers with each other and blends of these polymers with organic non-hydrocarbon polymers. In addition to hydrocarbon polymers, preferred examples of a receptive polymer include a large number of organic non-hydrocarbon polymers including homopolymers, copolymers, terpolymers, and the like. Typical of these organic non-hydrocarbon polymers are cellulose esters such as, for example, cellulose acetate-butyrate, cellulose acetate-propionate, cellulose acetate, cellulose propionate, cellulose butyrate, and the like; cellulose ethers such as, for example, hydroxyethyl cellulose, hydroxypropyl cellulose, and the like; polyesters such as poly(ethylene glycol terephthalate), drying and non-drying alkyd resins and the like; poly(alkylene oxide) polymers such as poly(ethylene oxide), poly(propylene oxide), poly(ethylene oxide) (propylene oxide), polyamides such as nylon, and the like; allyl pentaerythritol derivatives such as, for example, the condensate of triallyl pentaerythritol with diallylidene pentaerythritol, esters of triallyl pentaerythritol and drying oil fatty acids, and the like; poly(vinyl alkyl ethers) such as, for example, poly(vinyl methyl ether) and the like; poly(vinyl acetals) such as, for example, poly(vinyl butyral) and the like; vinyl chloride polymers having a vinyl chloride content of at least ten mol percent, such as, for example, poly(vinyl chloride), vinyl chloride-vinyl acetate copolymers, vinyl chloride-vinylidene chloride copolymers, vinyl chloride-maleic anhydride copolymers, vinyl chloride-fumaric acid copolymers, vinyl chloride-vinyl acetal copolymers, such as, for example, the vinyl chloride-vinyl butyral copolymers, vinyl chloride-vinylidene chloride-acrylonitrile terpolymers, vinyl chloride-vinylacetate-maleic anhydride terpolymers, and the like; nitrocellulose; chlorinated natural rubber; sulfochlorinated polyethylene; polysulfide rubber; polyurethane rubber; poly(vinyl acetate); ethylene-vinyl acetate copolymer; poly(vinylidene chloride); vinylidene chlorideacrylonitrile copolymers; ethyl acrylate-2-chloroethyl vinyl ether copolymers; poly(ethyl acrylate); poly(ethyl methacrylate); poly[3,3-bis(chloromethyl)oxetane]; vinyl modified poly(dimethylsiloxane); polychloroprene; butadiene-acrylonitrile copolymers; and the like.

To use an azide compound of this invention as a chain extender, bridging agent or cross-linking agent for a receptive polymer, at least one azide compound is blended with at least one receptive polymer, and the resulting blend or mixture is then treated to effect reaction of the azidoformate and azidosulfonyl radicals, preferably on a sequential basis, with monomer units in the polymer material capable of linkge reaction with these radicals.

The concentration of the azide compound in the blend can vary over a wide range, depending on whether chain extension, bridging or cross-linking is involved, and the extent to which each is desired in the final product. Generally, however, the concentration will be in the range from about 0.01 to about 50% by weight of the receptive polymer material, and preferably in a range from about 0.1 to about 5% by weight of the receptive polymer material. Higher and lower operable concentrations, however, are within the broader concepts of this invention.

The blend of receptive polymer and azide compound is made by conventional ways and means. For example, it is made by milling on a conventional rubber mill in a temperature range at which the polymer is sufficiently soft to permit dispersion in it of the azide compound. It is made also by dissolving the azide compound in a solution of the receptive polymer. Usually, the solvent is removed prior to subsequent heat treatment of the blend.

In addition to receptive polymer and azide compound, the blend can comprise other components such as, for example, one or more extenders, fillers, colorants including pigments and the like, plasticizers, stabilizers including antioxidants, ultraviolet light inhibitors, thermal stabilizers, and the like, anti-static agents, property improvers, and the like. In preferred embodiments of this invention, to tie a maximum amount of azide compound to the receptive polymer with a minimum of polymer degradation and without premature linking together of polymer chains, a component, which can be referred to as a "radical trap", is used. This radical trap consists essentially of at least one compound, in some embodiments two or more compounds, that inhibits free radical type reactions. Examples of such a compound include nitrobenzene, dinitrobenzene, 4,4'-thiobis(6-t-butyl-m-cresol), sulfur, 2,6-di-t-butyl-p-cresol, quinone, hydroquinone, phenylnapthylamine, and the like. The amount of the radical trap compound used can vary over a wide range. However, in general it is in a range from about 1% by weight to about 5 times the weight of the azide compound and preferably in a range from about 10 to about 100% by weight of the azide compound.

Treatment of the blend to effect linkage reaction between the azide compound and the receptive polymer material is by heat, by irradiation, or by both heat and irradiation.

In one general embodiment the blend with or without irradiation is established and maintained in a temperature range for a period of time selected to effect linkage reaction of a substantial portion of all of the azidoformate and azidosulfonyl radicals with the polymer material.

However, in another general embodiment this is done sequentially in two steps.

In the first step the blend with or without irradiation is established and maintained in a temperature range for a period of time selected to effect reaction of at least a substantial portion of the azidoformate radicals with the azidoformate radical receptive monomer units, with only a minimum, if at all, of the azidosulfonyl radicals undergoing reaction with azidosulfonyl radical receptive monomer units. The result is a modified but substantially unlinked polymer product that has approximately the same processability properties as the receptive polymer before reaction with the azidoformate radicals. Receptive monomer units present in the polymer chains are chemically bonded through reacted azidoformate radicals to azide compounds. The azidosulfonyl radicals are substantially unreacted, wherefore, these modified polymers have unreacted azidosulfonyl radicals. Each polymer thus modified has substantially the same processability properties as the unmodified receptive polymer, but now is capable of being linked by merely applying heat, irradiation, or both heat and irradiation to it to effect combination reaction between azidosulfonyl radical receptive monomer units and azidosulfonyl radicals. Such a polymer is termed herein an "ankylomeric polymer".

In the second step of this sequential general embodiment the ankylomeric polymer product with or without irradiation is established and maintained in a temperature range for a period of time selected to effect combination reaction of at least a substantial portion of the azidosulfonyl radicals with azidosulfonyl receptive monomer units and thereby link together a substantial portion of the ankylomeric polymer chains.

In one practice of the sequential embodiment the second step is performed right after the first step.

In another practice of the sequential embodiment the ankylomeric polymer product generally, but not necessarily, in the form of flakes, pellets or sheets, is cooled to 20°–25°C., and later, when desired, subjected to the second step. The ankylomeric polymer product, when cooled to 20°–25°C., can be stored and transported in bulk, or in containers such as bags, drums or the like, without substantial migration of linkage material to the surface of the polymer product and without substantial loss of linkage material by evaporation. The ankylomeric polymer product has further advantages in that it can be made on a large scale by the polymer producer, thereby permitting a more uniform product to be made, and then shipped in smaller quantities to the converter or fabricator, who may be limited in processing equipment and processing capacity, who performs the second step in making useful articles from it. In this connection the second step can be performed in preparing and applying coatings of the ankylomeric polymer product to wire, webs, sheets, shaped articles, and the like, in extruding the ankylomeric polymer product into articles such as, for example, pipes, rods, sheets, and the like, and in molding the ankylomeric polymer product into useful articles.

The best mode now contemplated for carrying out this invention is illustrated by the following examples of various aspects and specific embodiments of this invention. This invention is not limited to these specific embodiments. In the examples, all parts and percentages are by weight unless otherwise specified.

EXAMPLE 1

This example illustrates an embodiment of a process for making a product comprising 1-azidosulfonylpropyl-3-azidoformate which can also be named 3-azidosulfonylpropyl azidoformate.

1-Hydroxypropane-3-sulfonic acid sodium salt (32.4 parts) is added to a solution of phosgene (60 parts) in methylene chloride (200 parts) at −5°C. The resulting mixture is stirred for 3.5 hours at 0°C. and then allowed to warm up to room temperature (20°–25°C). Dimethylformamide (2.8 parts) is admixed with the reaction mixture and then phosgene is bubbled slowly through the mixture for 2 hours. After standing for 16 hours at 20°–25°C., the reaction mixture, typically a light yellow slurry, is sparged with nitrogen and then stripped of volatiles under aspirator vacuum. The remaining portion of the reaction mixture is with methylene chloride and centrifuged to remove the solids. The resulting solution is subjected to evaporation to remove the methylene chloride. The residue typically is an orange oil (42 parts). It consists essentially of 1-chlorosulfonylpropyl-3-chloroformate.

A portion (30 parts) of this oil is dissolved in methylene chloride (200 parts) and the resulting solution is admixed with a slurry of sodium azide (35.4 parts), water (70 parts) and acetone (79 parts). The mixture thus formed is stirred for 20 hours at 20°–25°C. Water (100 parts) is then admixed with the reaction mixture and after phase separation has taken place, the water-immiscible phase is separated from the aqueous phase, washed with water, dried over sodium sulfate, and then subjected to vacuum to remove substantially all of the methylene chloride. The product that remains is typically a yellow oil (28 parts). It consists essentially of 1-azidosulfonylpropyl-3-azidoformate.

A typical infrared spectrum of this product displays a strong carbonyl peak at 1745 cm.$^{-1}$, an azide peak at 2140 cm.$^{-1}$, and sulfonyl peaks at 1375 cm.$^{-1}$ and 1170 cm.$^{-1}$.

A typical elemental analysis of the material is as follows:

|  | N | S | Cl |
| --- | --- | --- | --- |
| Analyzed (%) | 30.9, 31.1 | 13.5 | 2.8 |
| Calculated (%) | 35.9 | 13.4 | — |

This product is useful as a cross-linking agent for polyethylene and the like.

EXAMPLE 2

This example illustrates a process for making a product comprising an azidosulfonylhexyl azidoformate isomer mixture.

A solution of n-hexyl chloroformate (280 parts), prepared from 1-hexanol and phosgene, and methylene chloride (4000 parts) is cooled to 5°C. Sulfur dioxide is then bubbled into this solution at the rate of 31 parts per hour. Fifteen minutes after commencement of the introduction of sulfur dioxide gas into the solution, the solution is exposed to utra-violet light and chlorine gas is also bubbled through the solution at the rate of 17.2 parts per hour. After seven hours, introduction of both gases is stopped, but the solution is left exposed to ultra-violet light for an additional hour. The solution, which typically is colorless at this stage, is warmed to 20°–25°C. It is then stripped by aspirator vacuum of residual unreacted gases and of methylene chloride while its temperature is raised to about 70°C. While maintaining its temperature at about 70°C., the mixture remaining is subjected for one-half to a vacuum of about 0.7 millimeter of mercury. Following this step, the remaining mixture is subjected to distillation to remove therefrom unreacted n-hexyl chloroformate. The residue is typically a dark amber oil (347 parts) consisting essentially of chlorosulfonylhexyl chloroformate isomers.

A portion (263 parts) of this oil is dissolved in methylene chloride (1000 parts) and the resulting solution is added dropwise to a slurry of sodium azide (260 parts), water (250 parts) and acetone (200 parts). The resulting mixture is stirred at 20°–25°C. for 15 hours and then refluxed at 48°C. for 5 hours. The reaction mixture thus obtained is washed with water and dried over sodium sulphate. The result is typically an amber colored solution. Activated carbon black is admixed with the solution and then removed by filtration. The filtrate is typically yellow. It is subjected to vacuum at 0.7 millimeters of mercury to remove solvent. The residue, the desired product, is typically a yellow oil (242 parts). It consists essentially of azidosulfonylhexyl azidoformate isomers. It also comprises azidosulfonylchlorohexyl azidoformate isomers.

A typical infrared spectrum of this product shows a strong azide doublet at 2135 cm.$^{-1}$ and 2180 cm.$^{-1}$, a strong carbonyl peak at 1735 cm.$^{-1}$, and sulfonyl peaks at 1165 cm.$^{-1}$, and 1365 cm.$^{-1}$.

A typical elemental analysis of the product is as follows:

|  | N | S | Cl |
| --- | --- | --- | --- |
| Analyzed (%) | 27.4, 27.7 | 11.1 | 4.2 |
| Calculated (%) | 30.4 | 11.6 | 0 |

This product is useful as a cross-linking agent for polypropylene and the like.

EXAMPLE 3

This example illustrates 1-(3-azidosulfonylpropoxy)-butyl-4-azidoformate, and its synthesis.

Sodium (11.5 parts) is gradually added to 1,4-butanediol (180 parts) established and maintained at 100°C. by heating. The temperature of the resulting solution is permitted to fall to 70°C. and, while maintaining the solution at this temperature, propanesultone (61 parts) is admixed dropwise with it. Typically a white solid precipitates and the reaction mixture becomes quite pastry. Consequently, tetrahydrofuran (220 parts) is added to make the reaction mixture more readily stirrable. The temperature of the thus diluted reaction mixture is established and maintained for 4 hours at 65°C. The reaction mixture is then slurried with acetone and filtered. The filter cake, typically a white solid material, is washed with acetone several times, and then the solvent portion is removed at 60°C. under vacuum. The material that remains is typically a white powdery solid (100 parts). It consists essentially of the sodium salt of 3-(hydroxybutoxy)-propylsulfonic acid.

A portion (82 parts) of this product is gradually added to a solution, established and maintained at −5°C., of phosgene (104 parts) in methylene chloride (345 parts) and dimethylformamide (4.7 parts). The resulting reaction mixture is typically a cream colored slurry. After stirring the slurry for 20 hours at 3°C., and then for 4 hours at 23°C., volatile substances are removed under aspirator vacuum. The portion of the reaction mixture that remains is typically a grey colored slurry.

To this slurry are added thionyl chloride (125 parts) and dimethylformamide (2.8 parts), and the resulting reaction mixture is stirred at 20°–25°C. for 64 hours. Volatiles are removed by vacuum from the reaction mixture and the slurry that results is diluted with methylene chloride and filtered. The filtrate is subjected to vacuum to remove substantially all of the methylene chloride. The residue is typically an amber oil (86 parts). It consists essentially of 1-(3-chlorosulfonylpropoxy)-butyl-4-chloroformate.

A portion (75 parts) of this oil is dissolved in acetone (160 parts) and the resulting solution rapidly stirred while a slurry of sodium azide (66 parts), water (100 parts) and acetone (80 parts) is admixed with it. The reaction mixture which results is stirred for 20 hours at 20°–25°C., and then refluxed at 51°C. for 3 hours. The reaction mixture is then admixed with water (400 parts) and methylene chloride (135 parts). Phase separation occurs. The non-aqueous phase is separated from the aqueous phase, water washed, dried over sodium sulfate, and then subjected to vacuum to remove therefrom substantially all of the methylene chloride. The residue comprises a typically light amber oil (66 parts). It consists essentially of 1-(3-azidosulfonylpropoxy)-butyl-4-azidoformate.

A typical infrared spectrum of this product has a strong azide peak at 2135 cm.$^{-1}$, a carbonyl peak at 1735 cm.$^{-1}$, as well as sulfonyl peaks at 1375 cm.$^{-1}$, and 1165 cm.$^{-1}$.

A typical elemental analysis of this product is:

|  | N | S |
|---|---|---|
| Analyzed (%) | 23.9, 24.2 | 12.2 |
| Calculated (%) | 27.5 | 10.5 |

This product has utility as a cross-linking agent for polyethers such as poly(ethylene oxide) and the like.

EXAMPLE 4

This example illustrates a process for making a product comprising an isomeric mixture of azidosulfonylcyclohexyl azidoformates.

A solution of cyclohexyl chloroformate (48 parts) in methylene chloride (1000 parts) is cooled at 5°C. while passing in sulfur dioxide gas at the rate of 9.6 parts per hour. After about 15 minutes the reaction mixture is exposed to ultraviolet light, and chlorine gas is introduced into the reaction mixture at the rate of 5.3 parts per hour. Both chlorine and sulfur dioxide are continuously added for 4 hours to the reaction mixture, and then their addition is stopped. The methylene chloride is removed by high vacuum from the reaction mixture, giving an isomeric mixture of chlorosulfonyl cyclohexyl chloroformate isomers. A typical yield of the mixture is 51 parts.

A portion (46 parts) of the chlorosulfonylcyclohexyl chloroformate isomer mixture is dissolved in methylene chloride (1000 parts) and added to a slurry of sodium azide (39 parts) in water (75 parts) and acetone (100 parts). The mixture thus formed is stirred rapidly and refluxed for 8 hours. It is then cooled to 20°–25°C. The resulting water-immiscible phase is removed from the aqueous phase, washed with water, dried, and then subjected to vacuum to remove the methylene chloride. The residue, the desired product, consists essentially of 1-azidosulfonylcyclohexyl-4-azidoformate and isomers of this compound.

A typical elemental analysis of this product is as follows:

|  | N | S |
|---|---|---|
| Analyzed (%) | 34.3 | 12.7 |
| Calculated (%) | 30.6 | 11.7 |

This product is useful as a cross-linking agent for polypropylene.

EXAMPLE 5

This example illustrates a process for making a product comprising a poly(azidosulfonyl)-chlorooctadecyl azidoformate.

A solution of n-octadecyl chloroformate (166 parts), 0.5 mole prepared from n-octadecanol and phosgene) in methylene chloride (2000 parts) is cooled to 5°C. Sulfur dioxide gas is then bubbled through the solution at the rate of 72 parts per hour. After 15 minutes chlorine gas is introduced into the reaction mixture at the rate of 39 parts per hour, and the reaction mixture is exposed to ultraviolet light. After 8 hours of reaction with both chlorine and sulfur dioxide bubbling into the reaction mixture, the addition of both gases is stopped, and the exposure of the reaction mixture to ultraviolet light is continued for an additional hour. The resulting reaction mixture, a colorless solution, is warmed to 20°–25°C. and stripped by vacuum of methylene chloride. The residue is typically a viscous oil (320 parts).

A portion (166 parts) of this oil is dissolved in methylene chloride (1000 parts) and added to a slurry of sodium azide (130 parts, 2 moles), acetone (400 parts) and water (250 parts). After stirring the resulting mixture for 20 hours at 20°–25°C., refluxing for 4 hours and cooling to 20°–25°C., the resulting water immiscible phase of the cooled reaction mixture is separated from the aqueous phase, water washed, dried and then stripped of methylene chloride to give the desired product, typically an amber oil (167 parts).

This product consists essentially of an isomeric mixture of tri(azidosulfonyl)-chlorooctadecyl azidoformates. A typical infrared spectrum of this product shows the strong azide band at 2145 cm.$^{-1}$, the carbonyl band at 1735 cm.$^{-1}$, and sulfonyl peaks at 1165 cm.$^{-1}$ and 1365 cm.$^{-1}$. A typical elemental analysis of the product is:

|  | S | N | Cl |
|---|---|---|---|
| Analyzed (%) | 13.3 | 23.7 | 4.2 |
| Calculated (%) | 13.9 | 24.4 | 5.1 |

This product is useful as a cross-linking agent for polypropylene.

EXAMPLE 6

This example illustrates a process for making an azidosulfonylphenethyl azidoformate.

A solution of phenylethyl chloroformate (18.5 parts, 0.1 mole) in chloroform (90 parts) is cooled to 3°C. and maintained at this temperature while chlorosulfonic acid (23.2 parts, 0.2 mole) is added dropwise. The resulting reaction mixture, typically a clear amber solution, is stirred for 2 hours at 3°C., and then gently refluxed (63°C.) for 2 hours. Typically a dark heavy oil layer forms during the refluxing. After cooling to 20°–25°C., the reaction product is poured onto wet ice. Although there is a tendency for the thus cooled reaction mixture to emulsify, ultimately it separates into a water immiscible phase and a water phase. The water immiscible phase is separated from the aqueous phase, washed once with ice water, and dried over magnesium sulfate. Chloroform is then stripped from the dried material to give typically a slightly viscous colorless oil. A typical infrared spectrum of this oil shows the strong carbonyl peak at 1780 cm.$^{-1}$, and bands at 1180 cm.$^{-1}$ and 1380 cm.$^{-1}$, which are indicative of the desired sulfonyl chloride radical.

A portion (5 parts) of the oil is added to a slurry of sodium azide (6.6 parts), water (10 parts), methylene chloride (25 parts) and acetone (12 parts). The mixture thus formed is stirred for 4 days at 20°–25°C. It is then admixed with water (50 parts) and methylene chloride (30 parts). The result is a two-phase mixture. The water immiscible phase is removed from the mixture, washed with water and dried over magnesium sulfate. Methylene chloride and acetone are removed by vacuum (final pressure is 1 millimeter of mercury) at 20°–25°C. to give the desired product (3.5 parts).

This product is typically a pale, yellow oil. It consists essentially of an isomeric mixture of azidosulfonylphenethyl azidoformates, one of which is p-azidosulfonylphenethyl azidoformate. The infrared spectrum of this product typically has the desired azide doublet at 2140 cm.$^{-1}$ and 2190 cm.$^{-1}$, a strong carbonyl band at 1740 cm.$^{-1}$ and the sulfonyl bands at 1175 cm.$^{-1}$ and 1375 cm.$^{-1}$. A typical elemental anaylsis of the product is:

|  | S | N |
| --- | --- | --- |
| Analyzed (%) | 12.7 | 24.6 |
| Calculated (%) | 10.8 | 28.4 |

This product is useful as a cross-linking agent for polypropylene.

EXAMPLE 7

This example illustrates a process for making 4-azidosulfonylbicyclohexyl-4'-azidoformate.

From the corresponding hydroxysulfonic acid, 4-chlorosulfonylbicyclohexyl-4'-chloroformate is prepared as described in Example 1. To 2.8 parts of the 4-chlorosulfonylbicyclohexyl-4'-chloroformate is added a slurry of sodium azide (4 parts), water (6 parts) and acetone (35 parts). The mixture thus formed is stirred for 19 hours at room temperature. The product is recovered by adding water (100 parts) to the reaction mixture and then extracting the product with methylene chloride. The water-immiscible phase is separated from the aqueous phase, washed with water, dried over sodium sulfate, and then subjected to vacuum to remove substantially all of the methylene chloride. The resulting 4-azidosulfonylbicyclohexyl-4'-azidoformate displays a strong infrared spectrum peak at 2150 cm.$^{-1}$ as well as a carbonyl peak at 1750 cm.$^{-1}$ and sulfonyl peaks at 1375 cm.$^{-1}$ and 1165 cm.$^{-1}$. The product was calculated to be 94% pure based on the evolution of nitrogen gas at 165°C.

This product is useful as a cross-linking agent.

EXAMPLE 8

This example illustrates the process for making 1-azidosulfonylphenyl-4-azidoformate.

The 1-chlorosulfonylphenyl-4-chloroformate is prepared from phenylchloroformate as described in Example 6. To 22 parts of the 1-chlorosulfonylphenyl-4-chloroformate in chloroform (100 parts) is added a slurry of sodium azide (26 parts), water (50 parts) and acetone (30 parts). The reaction mixture is rapidly stirred and refluxed for 6 hours. After cooling the organic layer is water washed and then dried over sodium sulfate. The chloroform is then removed by vacuum.

The 1-azidosulfonylphenyl-4-azidoformate shows normal infrared spectrum peaks at 2140 cm.$^{-1}$ and 2190 cm.$^{-1}$ as well as a strong carbonyl peak at 1740 cm.$^{-1}$.

A typical elemental analysis of the product is as follows:

|  | N | S |
| --- | --- | --- |
| Analyzed, Percent | 31.5 | 12.3 |
| Calculated for C$_7$H$_4$N$_6$O$_4$S, Percent | 31.3 | 11.9 |

This product is useful as a cross-linking agent.

EXAMPLE 9

This example illustrates the process for making 2-azidosulfonylnaphthalene-6-azidoformate.

The 2-chlorosulfonylnaphthalene-6-chloroformate is prepared from 6-naphthol-2-sulfonic acid. To 4 parts of the 2-chlorosulfonylnaphthalene-6-chloroformate in ethylene dichloride (100 parts) is added a slurry of sodium azide (8 parts), water (20 parts) and acetone (30 parts). The mixture thus formed is rapidly stirred and refluxed for 8 hours. After washing with water and drying over magnesium sulfate the ethylene dichloride is removed by vacuum. The resulting 2-azidosulfonylnaphthalene-6-azidoformate exhibits a typical infrared spectrum with azide peaks at 2140 cm.$^{-1}$ and 2190 cm.$^{-1}$ and a strong carbonyl peak at 1740 cm.$^{-1}$.

This product is useful as a cross-linking agent.

EXAMPLE 10

This example illustrates the process for making 4-azidosulfonylbiphenyl-4'-azidoformate.

A mixture of 3 parts of 4-chlorosulfonylbiphenyl-4'-chloroformate (prepared from the corresponding hydroxysulfonic acid) 90 parts of acetone, 5 parts of sodium azide, and 10 parts of water is rapidly stirred at room temperature for 19 hours. After washing with water and drying over sodium sulfate the product is recovered by removing the solvent under vacuum.

A typical elemental analysis of the 4-azidosulfonylbiphenyl-4'-azidoformate product is as follows:

|  | N | S |
| --- | --- | --- |
| Analyzed, Percent | 23.8 | 8.96 |
| Calculated for C$_{13}$H$_8$N$_6$O$_4$S, Percent | 24.4 | 9.31 |

This product is useful as a cross-linking agent.

EXAMPLE 11

This example illustrates a process for making 1-azidosulfonyl-3-bromophenyl-4-azidoformate.

A mixture of 15 parts of 1-chlorosulfonyl-3-bromophenyl-4-chloroformate in 90 parts of ethylene dichloride, 25 parts of water, 20 parts of acetone and 12 parts of sodium azide are stirred and refluxed for 6 hours. The organic layer is separated and washed with water then dried over magnesium sulfate and then subjected to vacuum to remove all of the solvent. The resulting 1-azidosulfonyl-3-bromophenyl-4-azidoformate exhibits a typical infrared spectrum with a carbonyl peak at 1740 cm.$^{-1}$ and an azide peak at 2140 cm.$^{-1}$.

The product is approximately 92% pure based on the evolution of nitrogen gas at 160°C.

This product is useful as a cross-linking agent.

EXAMPLE 12

This example illustrates the process for making an isomeric mixture of azidosulfonyl-2-chlorocyclohexyl-1-azidoformates.

A solution of 2-chlorocyclohexyl-1-chloroformate (20 parts) in methylene chloride (450 parts) is cooled at 5°C. while passing in sulfur dioxide gas at a rate of 4.0 parts per hour. After about 15 minutes the reaction mixture is exposed to ultraviolet light and chlorine gas is introduced into the reaction mixture at a rate of 2.5 parts per hour. Both chlorine and sulfur dioxide are continuously added for 4 hours to the reaction mixture, and then their addition is stopped. The methylene chloride is removed by high vacuum from the reaction mixture, giving a mixture of monochlorosulfonyl-2-chlorocyclohexyl-1-chloroformate isomers.

A portion (12 parts) of the monochlorosulfonyl-2-chlorocyclohexyl-1-chloroformate isomer mixture is added to acetone (90 parts), water (10 parts) and sodium azide (8 parts). The mixture thus formed is stirred rapidly at room temperature for 6 hours, then diluted with 300 parts of water, washed with water and dried over sodium sulfate. The resulting product consists essentially of 4-azidosulfonyl-2-chlorocyclohexyl-1-azidoformate and isomers of this compound.

A typical infrared spectrum of this product has a strong azide peak at 2150 cm.$^{-1}$ and a carbonyl peak at 1740 cm.$^{-1}$.

A typical elemental analysis of this product is:

|  | N | S |
|---|---|---|
| Analyzed, Percent | 27.7 | 10.7 |
| Calculated for $C_7H_9ClN_6O_4S$, Percent | 27.2 | 10.3 |

This product is useful as a cross-linking agent.

EXAMPLE 13

This example illustrates the process for making 1-(4'-azidosulfonylphenoxy)phenyl-4-azidoformate.

A solution of 4.1 parts of 1-(4'-chlorosulfonylphenoxy)phenyl-4-chloroformate in 70 parts chloroform is rapidly stirred and refluxed in a mixture of 3.1 parts of sodium azide, 15 parts of water and 20 parts of acetone for 7 hours. The organic layer is water washed and dried over sodium sulfate. After removing the solvent by vacuum the product 1-(4'-azidosulfonylphenoxy)phenyl-4-azidoformate exhibits the normal infrared azide peak at 2150 cm.$^{-1}$.

A typical elemental analysis of this product is:

|  | N | S |
|---|---|---|
| Analyzed, Percent | 22.7 | 8.7 |
| Calculated for $C_{13}H_8N_6O_5S$, Percent | 23.3 | 8.9 |

This product is useful as a cross-linking agent.

EXAMPLE 14

This example illustrates the process for making 1-(4'-azidosulfonylphenylsulfonyl)phenyl-4-azidoformate.

A mixture of 2.8 parts of 1-(4'-chlorosulfonylphenylsulfonyl)phenyl-4-chloroformate, acetone (75 parts), water (10 parts) and sodium azide (2 parts) is stirred and refluxed under nitrogen gas for 4 hours, then diluted with 150 parts of water. The resulting 1-(4'-azidosulfonylphenylsulfonyl)phenyl-4-azidoformate is recrystallized from warm alcohol.

A typical elemental analysis of this product is:

|  | N | S |
|---|---|---|
| Analyzed, Percent | 20.1 | 16.1 |
| Calculated for $C_{13}H_8N_6O_6S_2$, Percent | 20.5 | 15.7 |

This product is useful as a cross-linking agent.

EXAMPLE 15

This example illustrates a process for the preparation of a mixture of isomeric poly(azidosulfonyl)-dichlorotriacontane-30-azidoformates.

A solution of n-triacontanechloroformate (20 parts, prepared from n-triacontanol and phosgene) in methylene chloride (200 parts) is cooled to 5°C. Sulfur dioxide gas is then bubbled through the solution at a rate of about 7.2 parts per hour. After 15 minutes chlorine gas is introduced into the reaction mixture at a rate of 3.9 parts per hour, and the reaction mixture is exposed to ultraviolet light. After approximately 10 hours of reaction with both chlorine and sulfur dioxide bubbling into the reaction mixture, the addition of both gases is stopped and the exposure of the reaction mixture to ultraviolet light is continued for an additional 2 hours. The resulting product is an isomeric mixture of poly(chlorosulfonyl)-dichlorotriacontane-30-chloroformate containing an average of 5 chlorosulfonyl groups and 2 chloro groups per molecule.

A portion (3.1 parts) of this intermediate product is admixed with acetone (80 parts), water (15 parts) and sodium azide (9 parts) and stirred and refluxed for 5 hours. The resulting product is water washed, dried and then stripped of solvent to give poly(azidosulfonyl)-dichlorotriacontane-30-azidoformate containing an average of 5 azidosulfonyl groups and 2 chloro groups per molecule.

A typical elemental analysis of the product is:

|  | N | S | Cl |
|---|---|---|---|
| Analyzed, Percent | 22.4 | 14.7 | 6.8 |
| Calaculated for $C_{31}H_{54}O_{12}S_5N_{18}Cl_2$, Percent | 22.8 | 14.5 | 6.4 |

This product is useful as a cross-linking agent.

EXAMPLE 16

This example illustrates a process for the production of an isomeric mixture of poly(azidosulfonyl)-chlorotetradecane-1,14-bis azidoformates.

Poly(chlorosulfonyl)-chlorotetradecane11,14-bis chloroformate, containing an average of 2 sulfonyl chloride groups and 1 chlorine group per molecule, was prepared from tetradecane-1,14-bis chloroformate as described in Example 15. A portion (12 parts) of the poly(chlorosulfonyl)-chlorotetradecane-1,14-bis chloroformate is dissolved in ethylene dichloride (110 parts) and added to a slurry of sodium azide (12 parts)

in water (20 parts) and acetone (20 parts). The mixture thus formed is stirred rapidly and refluxed for 7 hours under an atmosphere of nitrogen. The reaction mixture is cooled, the organic layer washed with water and then dried over magnesium sulfate. The solvent is removed under vacuum yielding an isomeric mixture of poly(azidosulfonyl)-chlorotetradecane-1,14-bis azidoformates containing an average of 2 azidosulfonyl groups and 1 chlorine group per molecule. An infrared spectrum of the product shows a strong azide peak at 2150 cm.$^{-1}$ and a carbonyl peak at 1740 cm.$^{-1}$.

This product is useful as a cross-linking agent.

EXAMPLE 17

This example illustrates the use of the product of Example 1 as a cross-linking agent for polyethylene.

A commercially available molding grade polyethylene (100 parts) containing 4,4'-thiobis(6-t-butyl-m-cresol) (0.5 part) and calcium oxide (0.014 part) is milled on a two-roll mill at 280°–290°F. for 5 minutes. A quantity (0.55 part) of the 1-azidosulfonylpropyl-3-azidoformate product of Example 1 is added and the milling continued for 3 more minutes. The polymer product that results is ankylomeric polyethylene. The polyethylene has reacted with a substantial portion of the azidoformate radicals in the Example 1 product, but the azidosulfonyl radicals are substantially unreacted and the polymer product is not in a substantially cured condition.

The ankylomeric polyethylene is then compression molded into a sheet or any other article of desired size and shape. To effect cure or cross-linking of this polymer product the sheet or article is established and maintained at 419°F. for 15 minutes. The thus treated sheet or article is characterized by increased solvent resistance and by increased stress-crack resistance. It is also substantially odor free.

Instead of a milling and molding procedure, an extrusion procedure can be employed. In such a procedure extrusion grade polyethylene (100 parts) containing 4,4'-thiobis(6-t-butyl-m-cresol) (0.5 part) and calcium oxide (0.014 part) and a quantity (0.55 part) of the 1-azidosulfonylpropyl-3-azidoformate product of Example 1 are extruded together through an extruder at an extrusion temperature of about 330°F. and with an extruder residence time of about 1 minute. A suitable extruder, for instance, is a ¾ inch Braybender extruder employing a 20:1 LB plastic extrusion screw with a 3:1 compression ratio. The extruded polymer product is ankylomeric polyethylene in that the polyethylene has reacted with a substantial portion of the azidoformate radicals in the product of Example 1 without reaction of a substantial portion of the azidosulfonyl radicals. However, the polymer product is still soluble in substantially the same solvents as the polyethylene before extrusion. The ankylomeric polyethylene in substantially uncured condition, which can be in the form of a rod or the like, is divided into particles such as pellets, flakes and the like.

Thereafter, the extruded polymer product is either compression molded or extruded into any desired article. Curing of the polymer product in the molded or extruded article is effected by establishing and maintaining the article for about 10–15 minutes at 419°F. This can be done after formation of the article, and it can be done during formation of the article as part of the molding or extrusion procedure. Upon cooling of the article to room temperature, the article typically has substantially increased solvent resistance and substantially increased stress-crack resistance.

Instead of molding or extruding the polymer product into a shaped article, such can be applied as a curable coating to wire or a web. The cure or cross-linking is effected, when the coating thickness is 30–50 mils, by passing the coated wire or web at atmosphere pressure through a 419°F. oven with a residence time of about 10–15 minutes. When the coating thickness is greater than about 50 mils and forming of the coating is to be minimized, the cure or cross-linking is effected by passing the coated wire or web through a pressurized enclosure containing saturated steam at about 400°F. for about 4 minutes.

EXAMPLE 18

This example illustrates the use of the product of Example 1 as a coupling agent in the bonding of polypropylene to ethylenically unsaturated organo silane treated glass.

Sheets of 181-style, E-glass cloth, 8.9 ounces per square yard, Finish 112, pH neutral (heat cleaned), 8 sh satin weave (Hess Goldsmith & Company), are immersed in a water-solution of vinyl triacetoxysilane (1%), removed from the solution and then dried at a temperature of 23°C. for 16 hours.

The thus treated cloth is immersed in a tetrachloroethylene solution containing (at 0.14%) the 1-azidosulfonylpropyl-3-azidoformate product of Example 1, which solution is then established and maintained at a temperature of 121°C. for 1 ½ hours. Typically about 75% of the azidoformate radicals react with the treated glass cloth while about 80% of the azidosulfonyl groups remain intact without decomposition or reaction.

The thus treated sheets of glass cloth are removed from the perchloroethylene solution and placed in a vacuum oven at 60°C for 12 hours to remove the perchloroethylene.

A 12 ply assembly of alternate plies of sheets of 5 mil thick polypropylene and the thus treated sheets of glass cloth is formed. The assembly is compression molded at a temperature of 220°C. at a pressure of 250 pounds per square inch to a ⅛ inch thick laminate.

A test specimen 1 by 3 inch cut from the laminate and tested for flexural strength according to the American standard testing method D790 in a 2 inch span at 0.5 inch/min. crosshead speed has a typical flexural strength of 2600 psi.

A test specimen 1 inch by 3 inch cut from a control laminate made as above, except that treatment of the glass cloth with vinyl triacetoxysilane followed by the 1-azidosulfonylpropyl-3-azidoformate product of Example 1 is omitted, and tested for flexural strength according to this test method has a typical flexural strength of 1400 psi.

Hence, this invention provides a new and useful class of compounds. In addition it provides a new and useful class of polymers, namely, ankylomeric polymers.

Other features, advantages and specific embodiments of this invention will become readily apparent to those in the exercise of ordinary skill in the art after reading the foregoing disclosures. These specific embodiments are within the scope of the claimed subject matter, unless the contrary is indicated. Moreover, while specific embodiments have been described in considerable detail, variations and modifications of these embodiments can be effected without departing from the spirit and scope of the invention as disclosed and claimed. What I claim and desire to protect by Letters Patent is:

1. A process which comprises: forming a blend of (1) at least one polymer selected from the group consisting of saturated, unsaturated, linear, non-linear, crystalline and amorphous hydrocarbon homopolymers, copolymers and terpolymers; cellulose esters; cellulose ethers; polyesters; poly(alkylene oxide) polymers; polyamides; condensation products of triallyl pentaerythritol and diallylidene pentaerythritol; esters of triallyl pentaerythritol and drying oil fatty acids; poly(vinyl alkyl ethers); poly(vinyl acetals); vinyl chloride polymers having a vinyl chloride content of at least ten mol percent; nitrocellulose; chlorinated natural rubber; sulfochlorinated polyethylene; polysulfide rubber; polyurethane rubber; poly(vinyl acetate); ethylene-vinyl acetate copolymer; poly(vinylidene chloride); vinylidene chloride-acrylonitrile copolymers; ethyl acrylate-2-chloroethyl vinyl ether copolymers; poly(ethyl acrylate); poly(ethyl methacrylate); poly[3,3-bis(chloromethyl)oxetane]; vinyl modified poly(dimethyl siloxane); polychloroprene; and butadiene-acrylonitrile copolymers; and (2) from about 0.01 to about 50% by weight based on the weight of the polymer of at least one azide compound having the formula

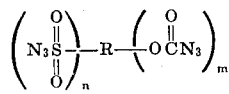

wherein R is a polyvalent organic radical substantially inert to linking reactions, n and m are each 1–10 and the

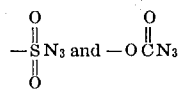

groups are attached to different carbon atoms in said R group; and establishing and maintaining said blend at an elevated temperature range for a period of time selected to effect reaction of a substantial portion of the

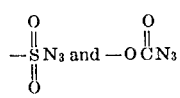

groups in said azide compounds with azidoformate and azidosulfonyl radical reactive monomer units in said polymer.

2. A process according to claim 1, wherein said blend is established and maintained in a temperature range for a period of time selected to effect combination reaction of a substantial portion of the

groups in the azide compound with azidoformate radical reactive monomer units in the polymer material without effecting combination reaction of a substantial portion of the

group in said azide compound with azidosulfonyl radical reactive monomer units in said polymer material, whereby an ankylomeric polymer product is obtained; and subsequently establishing and maintaining said ankylomeric polymer product in a temperature range for a period of time selected to effect combination reaction of a substantial portion of the

groups in said ankylomeric polymer product with azidosulfonyl radical reactive monomer units in said ankylomeric polymer product.

3. A process for making an ankylomeric polymer product, which comprises: forming a blend of (1) at least one polymer selected from the group consisting of saturated, unsaturated, linear, non-linear, crystalline and amorphous hydrocarbon homopolymers, copolymers and terpolymers; cellulose esters; cellulose ethers; polyesters; poly(alkylene oxide) polymers; polyamides; condensation products of triallyl pentaerythritol and diallylidene pentaerythritol; esters of triallyl pentaerythritol and drying oil fatty acids; poly(vinyl alkyl ethers); poly(vinyl acetals); vinyl chloride polymers having a vinyl chloride content of at least ten mol percent; nitrocellulose; chlorinated natural rubber; sulfochlorinated polyethylene; polysulfide rubber; polyurethane rubber; poly(vinyl acetate); ethylene-vinyl acetate copolymer; poly(vinylidene chloride); vinylidene chloride-acrylonitrile copolymers; ethyl acrylate-2-chloroethyl vinyl ether copolymers; poly(ethyl acrylate); poly(ethyl methacrylate); poly[3,3-bis(chloromethyl)oxetane]; vinyl modified poly(dimethyl siloxane); polychloroprene; and butadiene-acrylonitrile copolymers; and (2) from about 0.01 to about 50% by weight based on the weight of the polymer of at least one azide compound having the formula

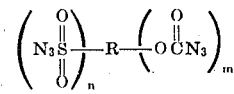

wherein R is a polyvalent organic radical substantially inert to linking reactions, n and m are each 1–10 and the

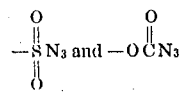

groups are attached to different carbon atoms in said R group; and establishing and maintaining said blend at an elevated temperature range for a period of time selected to effect reaction of a substantial portion of the

groups in said azide compound with azidoformate radical reactive monomer units in said polymer without effecting reaction of the

group in said azide compound with azidosulfonyl radical reactive monomer units in said polymer.

4. A process which comprises: establishing and maintaining an ankylomeric polymer product at an elevated temperature range for a period of time selected to effect reaction of a substantial portion of the

groups in said ankylomeric polymer product with azidosulfonyl radical reactive monomer units in said ankylomeric polymer product, said ankylomeric polymer product being a polymer selected from the group consisting of saturated, unsaturated, linear, non-linear, crystalline and amorphous hydrocarbon homopolymers, copolymers and terpolymers; cellulose esters; cellulose ethers; polyesters; poly(alkylene oxide) polymers; polyamides; condensation products of triallyl pentaerythritol and diallylidene pentaerythritol; esters of triallyl pentaerythritol and drying oil fatty acids; poly(vinyl alkyl ethers); poly(vinyl acetals); vinyl chloride polymers having a vinyl chloride content of at least ten mol percent; nitrocellulose; chlorinated natural rubber; sulfochlorinated polyethylene; polysulfide rubber; polyurethane rubber; poly(vinyl acetate); ethylene-vinyl acetate copolymer; poly(vinylidene chloride); vinylidene chloride-acrylonitrile copolymers; ethyl acrylate-2-chloroethyl vinyl ether copolymers; poly(ethyl acrylate); poly(ethyl methacrylate); poly[3,3-bis(chloromethyl)oxetane]; vinyl modified poly(dimethyl siloxane); polychloroprene; and butadiene-acrylonitrile copolymers, which has been modified by reaction with at least one azide compound having the formula

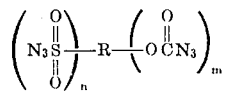

wherein R is a polyvalent organic radical substantially inert to linking reactions, n and m are each 1–10 and the

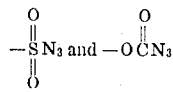

are attached to different carbon atoms in said R group, under conditions such that the said azide compound has been attached to the polymer through the

groups leaving the

groups substantially unreacted.

5. An ankylomeric polymer comprising a polymer selected from the group consisting of saturated, unsaturated, linear, non-linear, crystalline and amorphous hydrocarbon homopolymers, copolymers and terpolymers; cellulose esters; cellulose ethers; polyesters; poly(alkylene oxide) polymers; polyamides; condensation products of triallyl pentaerythritol and diallylidene pentaerythritol; esters of triallyl pentaerythritol and drying oil fatty acids; poly(vinyl alkyl ethers); poly(vinyl acetals); vinyl chloride polymers having a vinyl chloride content of at least ten mol percent; nitrocellulose; chlorinated natural rubber; sulfochlorinated polyethylene; polysulfide rubber; polyurethane rubber; poly(vinyl acetate); ethylene-vinyl acetate copolymer; poly(vinylidene chloride); vinylidene chlorideacrylonitrile copolymers; ethyl acrylate-2-chloroethyl vinyl ether copolymers; poly(ethyl acrylate); poly(ethyl methacrylate); poly[3,3-bis(chloromethyl)oxetane]; vinyl modified poly(dimethyl siloxane); polychloroprene; and butadiene-acrylonitrile copolymers, which has been modified by reaction with at least one azide compound having the formula

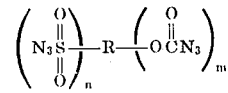

wherein R is a polyvalent organic radical substantially inert to linking reactions, n and m are each 1–10 and the

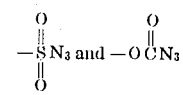

groups are attached to different carbon atoms in said R group, under conditions such that the said azide compound has been attached to the polymer through the

groups leaving the

groups substantially unreacted.

6. A polymer selected from the group consisting of saturated, unsaturated, linear, non-linear, crystalline and amorphous hydrocarbon homopolymers, copolymers and terpolymers; cellulose esters; cellulose ethers; polyesters; poly(alkylene oxide) polymers; polyamides; condensation products of triallyl pentaerythritol and diallylidene pentaerythritol; esters of triallyl pentaerythritol and drying oil fatty acids; poly(vinyl alkyl ethers); poly(vinyl acetals); vinyl chloride polymers having a vinyl chloride content of at least ten mol percent; nitrocellulose; chlorinated natural rubber; sulfochlorinated polyethylene; polysulfide rubber; polyurethane rubber; poly(vinyl acetate); ethylene-vinyl acetate copolymer; poly(vinylidene chloride); vinylidene chloride-acrylonitrile copolymers; ethyl acrylate-2-chloroethyl vinyl ether copolymers; poly(ethyl acrylate); poly(ethyl methacrylate); poly[3,3-bis(chloromethyl)oxetane]; vinyl modified poly(dimethyl siloxane); polychloroprene; and butadiene-acrylonitrile copolymers cross-linked by reaction with at least one azide compound having the formula

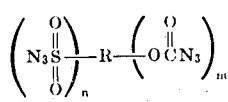

wherein R is a polyvalent organic radical substantially inert to linking reactions, *n* and *m* are each 1–10 and the

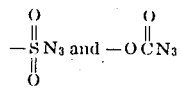

groups are attached to different carbon atoms in said R group.

7. A cross-linkable composition comprising a blend of (1) at least one polymer selected from the group consisting of saturated, unsaturated, linear, non-linear, crystalline and amorphous hydrocarbon homopolymers, copolymers and terpolymers; cellulose esters; cellulose ethers; polyesters; poly(alkylene oxide) polymers; polyamides; condensation products of triallyl pentaerythritol and diallylidene pentaerythritol; esters of triallyl pentaerythritol and drying oil fatty acids; poly(vinyl alkyl ethers); poly(vinyl acetals); vinyl chloride polymers having a vinyl chloride content of at least ten mol percent; nitrocellulose; chlorinated natural rubber; sulfochlorinated polyethylene; polysulfide rubber; polyurethane rubber; poly(vinyl acetate); ethylene-vinyl acetate copolymer; poly(vinylidene chloride); vinylidene chloride-acrylonitrile copolymers; ethyl acrylate-2-chloroethyl vinyl ether copolymers; poly(ethyl acrylate); poly(ethyl methacrylate); poly[3,3-bis(chloromethyl)oxetane]; vinyl modified poly(dimethyl siloxane); polychloroprene; and butadiene-acrylonitrile copolymers; and (2) from about 0.01 to about 50% by weight based on the weight of the polymer of at least one azide compound having the formula

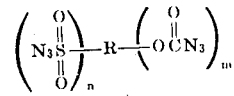

wherein R is a polyvalent organic radical substantially inert to linking reactions, *n* and *m* are each 1–10 and the

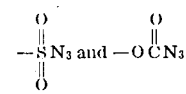

groups are attached to different carbon atoms in said R group.

* * * * *

UNITED STATES PATENT OFFICE
CERTIFICATE OF CORRECTION

Patent No. 3,859,261  Dated January 7, 1975

Inventor(s) David S. Breslow

It is certified that error appears in the above-identified patent and that said Letters Patent are hereby corrected as shown below:

Column 7, line 26 of printed patent;
"34," should read --3,4--

Column 7, line 28 of printed patent;
"azidosulfonylphanyl" should read
--azidosulfonylphenyl--

Column 11, line 8 of printed patent;
"5" should read --3--

Column 16, line 64 of printed patent;
Insert --mixed-- after "is"

Column 17, line 51 of printed patent;
Insert --hour-- after "one-half"

Column 18, line 33 of printed patent;
"pastry" should read --pasty--

Column 24, line 61 of printed patent;
"11,14-bis" should read -- -1,14-bis--

Signed and sealed this 4th day of March 1975.

(SEAL)
Attest:

RUTH C. MASON
Attesting Officer

C. MARSHALL DANN
Commissioner of Patents
and Trademarks